United States Patent [19]
Noda

[11] Patent Number: 5,166,827
[45] Date of Patent: Nov. 24, 1992

[54] GRADIENT INDEX OPTICAL ELEMENT

[75] Inventor: Satoshi Noda, Akishima, Japan

[73] Assignee: Olympus Optical Co., Ltd., Tokyo, Japan

[21] Appl. No.: 602,647

[22] Filed: Oct. 24, 1990

[30] Foreign Application Priority Data

Oct. 27, 1989 [JP] Japan .................. 1-280897

[51] Int. Cl.$^5$ ............ G02B 3/00; G02B 9/00
[52] U.S. Cl. .................. 359/652; 359/653; 359/654
[58] Field of Search .......... 359/652, 653, 654

[56] References Cited

U.S. PATENT DOCUMENTS

| | | | |
|---|---|---|---|
| 3,859,103 | 1/1975 | Yoshiyagawa et al. | 359/654 |
| 4,755,039 | 7/1988 | Hattori | 359/652 |
| 4,971,423 | 11/1990 | Nakada et al. | 359/652 |
| 5,032,000 | 7/1991 | Shingaki et al. | 359/652 |

FOREIGN PATENT DOCUMENTS

| | | |
|---|---|---|
| 59-41934 | 10/1984 | Japan . |
| 60-6295 | 2/1985 | Japan . |
| 60-218614 | 11/1985 | Japan . |

OTHER PUBLICATIONS

Electronics Letters vol. 22, No. 21, Oct. 9, 1986, pp. 1108-1110.
Electronics Letters vol. 22, No. 2, Jan. 16, 1986, pp. 99-100.
Journal of Non-Crystalline Sounds 100 (1988) 506-510.

*Primary Examiner*—Paul M. Dzierzynski
*Assistant Examiner*—Hung Xuan Dang
*Attorney, Agent, or Firm*—Cushman, Darby & Cushman

[57] ABSTRACT

A gradient index optical element includes a first metal which is at least one kind of metal selected from the metals of Group A each having the content of 10-40 mol % in terms of oxide and a second metal which is at least one kind of metal selected from the metals of Group B each having the content of 2-15 mol % in terms of oxide, in which the first and second metals are distributed so that the concentration of one of said first and second metals increases from the center of the optical element toward the periphery and that of the other decreases. Hence, the gradient index optical element has an important advantage in practical use that the correction for chromatic aberration is excellent, that is, the Abbe's number increases as the refractive index becomes great.

7 Claims, 3 Drawing Sheets

GRADIENT INDEX OPTICAL ELEMENT

BACKGROUND OF THE INVENTION a) Field of the invention

This invention relates to a gradient index optical element.

b) Description of the prior art

The gradient index optical element has aroused considerable attention as the optical element indispensable for the optical system of the coming generation due to its excellent ability to correct aberrations.

At present, various gradient index optical elements are available, not to speak of SELFOC (registered trademark) lenses and slab lenses already commercially available, which have been studied and developed by many enterprises and research institutions.

The gradient index optical element is adapted to provide its medium with index distribution, thereby rendering the medium per se in possession of a power (refracting power). The power depends on the index distribution and for the increase of the power, it is only necessary to increase the gradient difference (which is hereinafter referred to as $\Delta n$) of a refractive index n. Hence, increasing $\Delta n$ is a subject given great study and development of the gradient index optical element and the study for increasing $\Delta n$ is made by many researchers. For instance, in the optical element commercially available under the name of the SELFOC lens, $\Delta n$ is increased by providing the concentration gradient of Tl through ion exchange.

Moreover, a lens configured as $\Delta n \approx 0.04$ in which the concentration gradients of Pb and K are given by a sol-gel method (J. Non-Cry. Sol. 100, pp. 506–510, 1988) and a lens of $\Delta n = 0.03$ derived from the concentration gradient of Ti or Ge [Elect. Lett. 22, pp. 99–100 (1986); Elect. Lett. 22, pp. 1108–1110 (1986)] are available.

Most of the up-to-date developments of the gradient index optical element rely on the approach that $\Delta n$ and the outer diameter of the lens are made larger and are backward in provision of diminishing chromatic aberration of the optical element. Furthermore, in the gradient index optical element, although it is possible to decrease extremely the number of lenses when the optical element is conducted into an optical system due to its excellent correction ability for aberrations, discrepancy is encountered that the correction for chromatic aberration becomes difficult as the number of lenses decreases. Accordingly, to construct a lens system including the gradient index optical element and completely corrected for the chromatic aberration, there is the necessity of taking such a measure that an achromatic lens is incorporated in the lens system when occasion demands, and as such the merit of the gradient index optical system will be reduced by half.

Thus, in order to secure the lens system corrected for the chromatic aberration with a small number of lenses, it is of significance that the chromatic aberration per se produced for each lens is diminished. For this purpose, as requirements for the medium of the gradient index optical element, the following properties are desirable.

In a radial gradient index optical element, the refractive index of the medium varies according to a position (a distance from an optical axis) which a ray of light traverses so that the angle of refraction of the light ray changes. Assuming now that the Abbe's number $$\left[ \nu d = \frac{nd - 1}{nF - nc} \right]$$

of the medium is uniform, the light ray is largely refracted in the region of high refractive indices as shown in FIG. 1A and therefore the extension caused by the difference of wavelength of the ray increases compared with that of the region of low refractive indices. In brief, if the Abbe's number $\nu_d$ is constant, the chromatic aberration ($n_F - n_C$) will increase as the refractive index $n_d$ increases. As such, for the reduction of the chromatic aberration ($n_F - n_C$), it is desirable that the Abbe's number is larger in the region of high refractive indices as shown in FIG. 1B. It follows from this that the behavior of changing from a high refractive index with low dispersion to a low refractive index with high dispersion is favorable for the property of the medium.

Further, an axial gradient index optical element, which has different refractive indices according to locations of the axial direction of the optical element, also has the same property as those of ordinary cemented achromatic lenses (doublets) illustrated in FIGS. 2A and 2B. That is, instead of the doublet having, with a boundary at a cemented surface, the high refractive index on one side and the low refractive index on the other side, the optical element is constructed so that the refractive index changes progressively in going from one surface to the other of the element, and thereby the optical element changing from the low refractive index with high dispersion to the high refractive index with low dispersion in going from an incident surface to an emergent surface as shown in FIG. 2C corresponds to FIG. 2A, whereas that changing from the high refractive index with low dispersion to the low refractive index with high dispersion in going from the incident surface to the emergent surface as in FIG. 2D to FIG. 2B, so that each of them has a similar property. Accordingly, in the axial gradient index optical element, it is said that, like the radial gradient index optical element, the property of changing from the high refractive index with low dispersion to the low refractive index with high dispersion is desirable.

This demonstrates that with respect to the $n_d$-$\nu_d$ diagram shown in FIG. 3, the element whose optical characteristic changes in an A direction is superior in correction for chromatic aberration to that changing in a B direction (refer to Japanese Patent Preliminary Publication No. Sho 60-218614).

The gradient index optical elements developed at present, however, are aimed in most cases at the increase of $\Delta n$ and in regard to those derived from the ion exchange such as Tl+ ⟷ K+ and Ag+ ⟷ Na+, the Abbe's number decreases as the refractive index ($n_d$) becomes high. That is, this indicates the distribution in the B direction shown in FIG. 3.

Further, the elements constructed by the sol-gel method and the concentration gradient of Pb and Ti, although large in $\Delta n$, are such that the Abbe's number diminishes with increase of the refractive index ($n_d$). That is, this demonstrates the distribution in the B direction of FIG. 3.

As a consequence of the foregoing, although such elements are large in $\Delta n$ and have high correction abilities for spherical aberration, curvature of field, and distortion, they are not necessarily regarded as fine optical elements in view of the correction for chromatic aberration.

As for the distribution in the A direction, on the other hand, the elements constructed by means of the ion exchange of Li+ are available (Japanese Patent Publication No. Sho 59-41934). In such elements, however, the contribution to the refractive index of glass of Li+ per mol is not substantially made and as such where Δn is intended for increase, the concentration of Li+ must be made higher, with the result that it has been not achieved that Δn is increased without lowering the durability of glass.

SUMMARY OF THE INVENTION

It is, therefore, the object of the present invention to provide a gradient index optical element in which Δn is great and correction for chromatic aberration is fine, namely, the Abbe's number increases as the refractive index becomes high.

To achieve this object, the inventor has found, as a result of his earnest study, that the gradient index optical element is excellent in correction for chromatic aberration which contains a metal of 10-40 mol % in terms of oxide, preferably 15-30 mol %, among the following metals of Group A, and a metal of 2-15 mol % in terms of oxide, preferably 5-10 mol %, among the following metals of Group B, in glass, as those contributing to the formation of index distribution, so as to have concentration distribution of two kinds of metals in directions opposite to each other. The metals of Group A are Ba, La, Sr, Ca, Ge, Zr, Y, and Zn and those of Group B are Ta, Nb, Pb, Ti, Bi, Zn, and Zr. The gradient index optical element in which metal elements of at least one kind from each of these groups are included with the concentration distribution in directions opposite to each other, is the target for accomplishing the object of the present invention. FIGS. 4A and 4B are views for explaining the concentration distribution of each metal where the present invention is applied to the radial gradient index optical element. In each of these diagrams, the abscisa axis indicates a distance from the, center of the optical element and the ordinate axis represents the concentration of the metal. In FIG. 4A, the concentration of each metal of Group A decreases from the center of the optical element toward the periphery and conversely that of Group B increases. FIG. 4B shows tendencies opposite to FIG. 4A. Types of FIGS. 4A and 4B follow respective inverse directions of the distribution with a mere difference relative to whether the power of the medium is positive or negative and hence have the same effect in either case from the point of view of the correction for chromatic aberration. The present invention involves both cases.

On the other hand, FIGS. 6A and 6B are views for explaining the concentration distribution of each metal where the present invention is applied to the axial gradient index optical element. In each of these diagrams, the abscissa axis denotes a distance measured along an axial direction from one surface of the optical element. In FIG. 6A, the concentration of each metal of Group A increases from the surface of the optical element toward the inside and that of Group B decreases from the surface toward the inside. FIG. 6B shows inverse tendencies in increase and decrease of Groups A and B.

The contents (mol %), in terms of oxide, of the metals of Groups A and B have some latitude, which means that the combination of the optimum metal contents (mol %) varies somewhat according to kinds of metals selected from Groups A and B and the amount of generation of chromatic aberration (corresponding to an angle made with the A direction in FIG. 3) is arbitrarily secured by changing variously the difference between the metal contents (mol %) of Groups A and B.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1A:
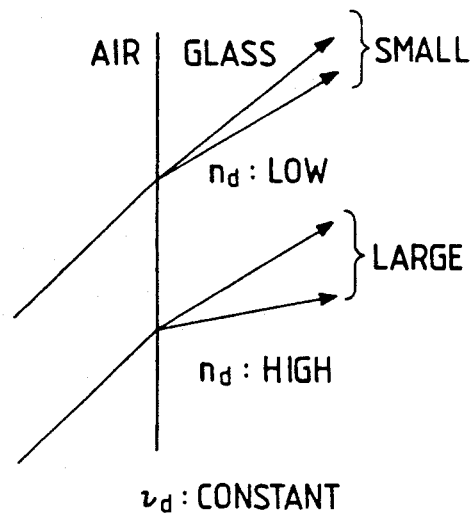
FIGS. 1A and 1B are diagrams showing dispersion properties where the refractive index is constant and in an ideal state, respectively.
Figure 1B:
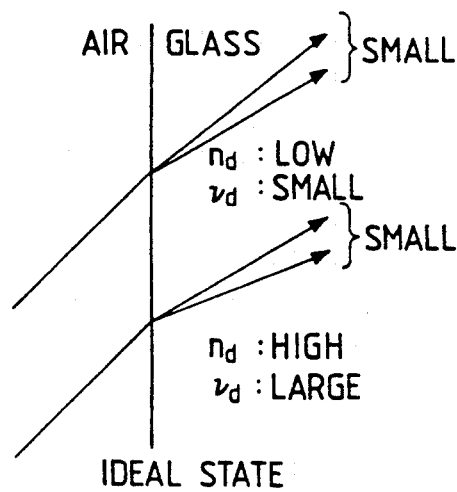
Figure 2A:
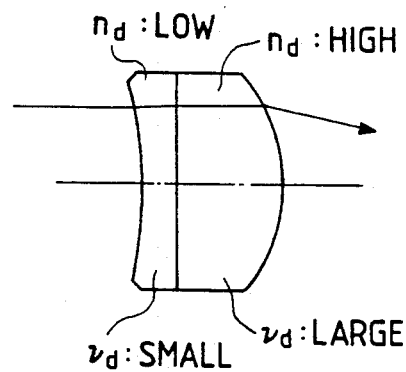
FIGS. 2A to 2D are views showing principles of cemented achromatic lenses.
Figure 2B:
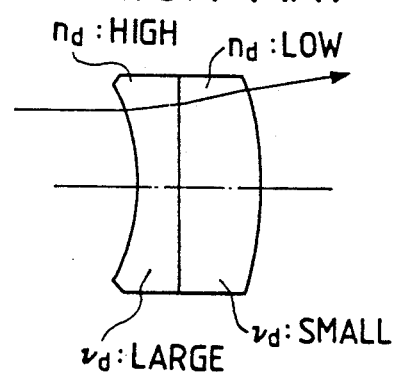
Figure 2C:
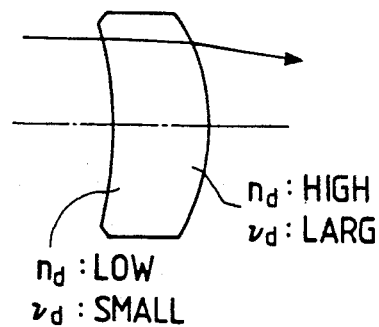
Figure 2D:
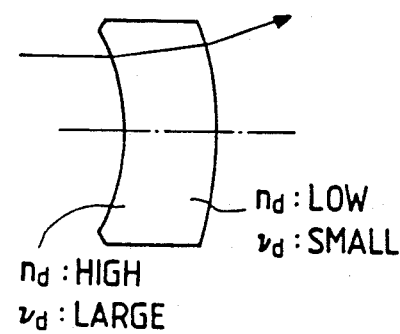

In accordance with the embodiments shown in the drawings, the present invention will be described in detail below.

Embodiment 1

Figure 3:
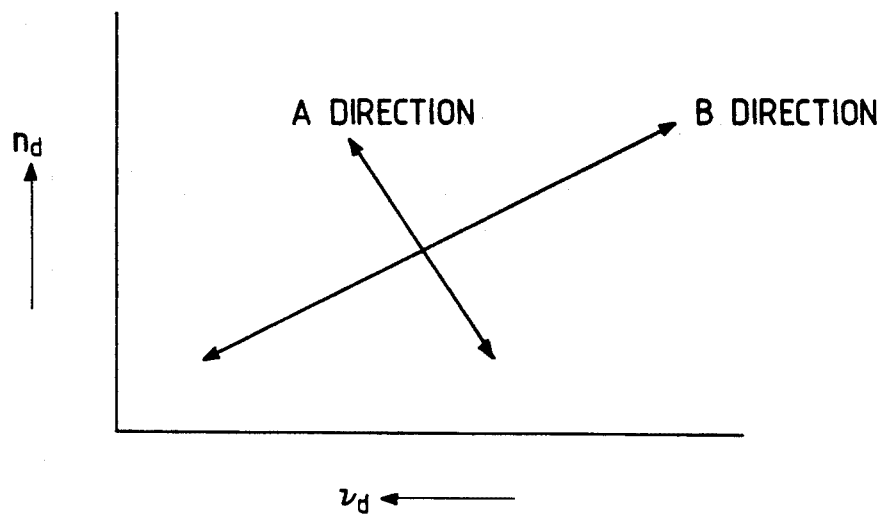
FIG. 3 is a diagram showing the relationship between the refractive index and the Abbe's number of the gradient index optical element which indicates a favorable state and an unfavorable state.

This embodiment assumes a radial gradient index optical element having distribution that the content of $ZrO_2$ reduces almost parabolically from the center toward the periphery so that the content of $ZrO_2$ is 30 mol % and that of $TiO_2$ is 0 mol % at the center and the content of $ZrO_2$ is 0 mol % at the periphery, and that the content of $TiO_2$ increases almost parabolically from the center toward the periphery, in a direction opposite to the distribution of the content of $ZrO_2$, so that the content of $TiO_2$ is 10 mol %. Measurements of the index distribution in the embodiment show that $n_d=1.6513$ and $\nu_d=42.8$ at the center and $n_d=1.5682$ and $\nu_d=38.3$ at the periphery and it was found that the resultant distribution follows the A direction in FIG. 3 that $\Delta n=-0.0832$ and $\Delta\nu_d=-4.6$. The embodiment, in which it can be estimated that the correction ability for chromatic aberration is fine, is usable as a very useful gradient index optical element.

Embodiments 2 to 18

These embodiments, as listed in the following table, have likewise the distribution of the A direction even in the case where the components having the concentration distribution of directions opposite to each other are equivalent to the metals of the contents (mol %) in terms of oxide which are stated in Groups A and B, and are excellent in correction ability for chromatic aberration.

Embodiments 19 to 21

Figure 4A:
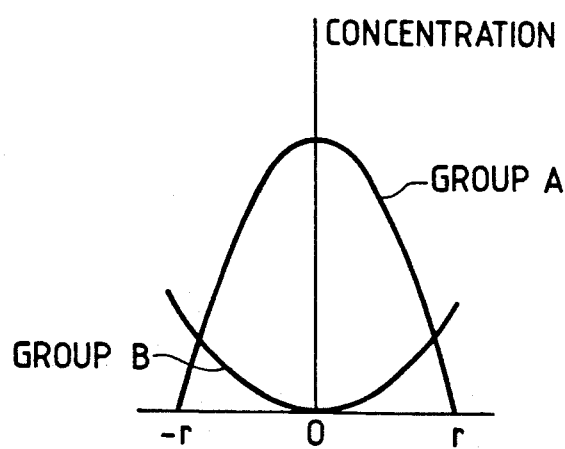
FIGS. 4A and 4B are diagrams showing concentration distribution of the gradient index optical element according to the present invention.
Figure 4B:
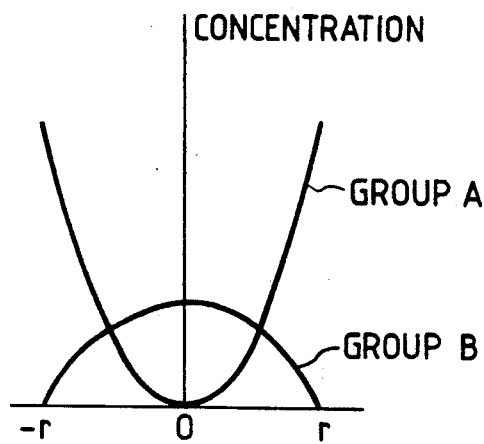

While Embodiments 1 to 18 are simple systems, in each of which the components distributed in two directions opposite to each other in FIGS. 4A and 4B are of one kind each, Embodiments 19 to 21 are complex systems, in each of which many components are distributed. These effects, however, are the same.

Embodiments 22 to 27

Figure 5:
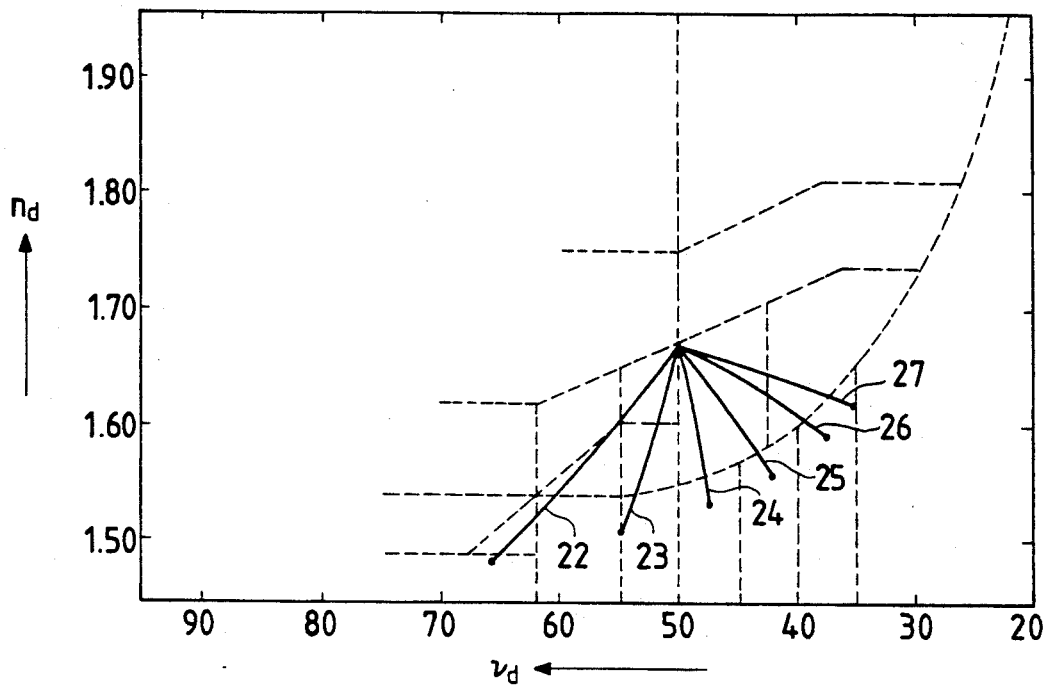
FIG. 5 is a diagram showing the relationships between the refractive index and the Abbe's number in Embodiments 22 to 27 according to the present invention.

These embodiment are adapted to vary the correction for chromatic aberration (corresponding to the gradient in the A direction of FIG. 3) by changing the ratio of the components. It will be seen that the content of $TiO_2$ increases from Embodiments 22 toward Embodiments 27 and $\Delta n$ and $\Delta \nu$ change accordingly, with the change of signs of $\Delta \nu$, thereby enabling the correction ability of chromatic aberration to be arbitrarily changed. This situation is shown by the $n_d$-$\nu_d$ diagram in FIG. 5.

Also, such distribution exercises good effects on both the radial gradient index optical element and the axial gradient index optical element. Further, it is needless to say that the distribution serves for the correction for chromatic aberration, independently of the positive and negative of the power of the medium.

TABLE

| Em- bodiment | Group A Metal | Con- tent | Group B Metal | Con- tent | Property $\Delta n$ | $\Delta \nu$ | Type |
|---|---|---|---|---|---|---|---|
| 1 | Zr | 30 | Ti | 10 | −0.083 | −4.6 | A |
| 2 | Zr | 30 | Bi | 5 | 0.061 | 3.4 | B |
| 3 | Ba | 40 | Ti | 10 | 0.089 | 13.9 | B |
| 4 | Zr | 20 | Nb | 5 | −0.038 | −1.2 | A |
| 5 | Ba | 30 | Zn | 3 | 0.071 | 3.2 | B |
| 6 | Y | 30 | Ti | 10 | −0.099 | −11.8 | A |
| 7 | Y | 20 | Ta | 5 | −0.081 | −3.2 | A |
| 8 | Sr | 30 | Pb | 3 | 0.073 | 3.4 | B |
| 9 | Ba | 30 | Pb | 5 | 0.098 | 3.5 | B |
| 10 | Y | 20 | Ti | 5 | −0.099 | −4.7 | A |
| 11 | Zr | 30 | Ti | 5 | −0.123 | −4.2 | A |
| 12 | Zn | 30 | Pb | 5 | −0.026 | −1.4 | A |
| 13 | La | 25 | Nb | 5 | −0.127 | −6.4 | A |
| 14 | Ca | 40 | Ti | 3 | −0.081 | −6.2 | A |
| 15 | La | 30 | Ti | 5 | 0.190 | 3.9 | B |
| 16 | Ge | 30 | Ta | 3 | −0.055 | −1.0 | A |
| 17 | Y | 15 | Pb | 5 | 0.076 | 1.4 | B |
| 18 | Y | 15 | Zr | 10 | −0.057 | −1.1 | A |
| 19 | Ba Y | 10 15 | Ti | 5 | −0.104 | −6.7 | A |
| 20 | Zn Ca Sr | 12 15 8 | Pb | 4 | 0.062 | 2.8 | B |
| 21 | La | 20 | Ta Ti | 3 3 | −0.121 | −6.3 | A |
| 22 | Y | 30 | — | — | −0.196 | 17.4 | A |
| 23 | Y | 30 | Ti | 2.5 | −0.167 | 4.6 | A |
| 24 | Y | 30 | Ti | 5 | −0.139 | −3.1 | A |
| 25 | Y | 30 | Ti | 7.5 | −0.126 | −8.2 | A |
| 26 | Y | 30 | Ti | 10 | −0.099 | −11.8 | A |
| 27 | Y | 30 | Ti | 12.5 | −0.069 | −14.6 | A |

In the Table, symbols $\Delta n$ and $\Delta \nu$ represent the differences of refractive indices and Abbe's numbers, respectively, at positions where the concentration of metals of each group is maximum and minimum, namely, values obtained by subtracting the refractive index and Abbe's number at the center from those on the periphery in the radial gradient index optical element and values obtained by subtracting the refractive index and Abbe's number at the finish of a concentration change from those at the start in the axial gradient index optical element. Also, the unit of the amount of metal of each group is represented by mol %.

Figure 6A:
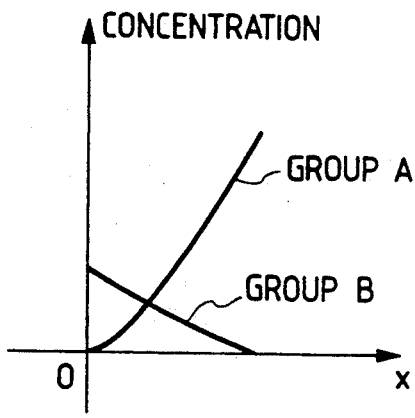
FIGS. 6A and 6B are diagrams showing concentration distribution of the gradient index optical element in a case different from FIGS. 4A and 4B.
Figure 6B:
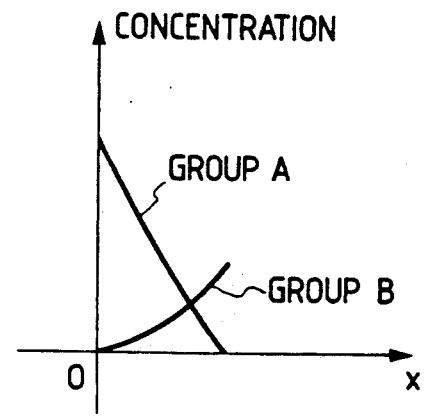

Symbols A and B in the right-hand column of the Table indicate that the concentration distribution of respective embodiments is of either type of FIG. 4A (or FIG. 6A) and FIG. 4B (or FIG. 6B), respectively.

As will be seen from the individual embodiments, according to the present invention, variations of the refractive index and the Abbe's number are secured in the range of the equations $$0.02 < |\Delta n| < 0.2$$

$$0 < |\Delta \nu| < 18$$

What is claimed is:

1. A gradient index optical device comprising an optical element including a first metal which is at least one kind of metal selected from the group of Ba, La, Sr, Ca, Ge, Zr, Y, and Zn each having the content of 10–40 mol % in terms of oxide and a second metal which is kind of metal selected from the group of Ta, Nb, Pb, Ti, Bi, Zn, and Zr each having the content of 2-15 mol % in terms of oxide, wherein said first and second metals are selected so as to be different from one another, and wherein said optical element has a concentration distribution such that concentration of one of said first and second metals increases and the concentration of the other decreases from a surface of said optical element toward the interior of the optical element.

2. The gradient index optical device according to claim 1, wherein said optical element is a radial gradient index optical element such that a refractive index changes in a radial direction of said optical element, wherein said first metal is distributed so that the concentration decreases parabolically from a center of said optical element toward a periphery thereof and said second metal is distributed so that the concentration increases parabolically from the center toward the periphery.

3. The gradient index optical device according to claim 1, wherein said optical element is a radial gradient index optical element such that a refractive index changes in a radial direction of said optical element wherein said first metal is distributed so that the concentration increases parabolically from a center of said optical element toward a periphery thereof and said second metal is distributed so that the concentration decreases parabolically from the center toward the periphery.

4. The gradient index optical device according to claim 1, wherein said optical element is an axial gradient index optical element such that a refractive index changes in an axial direction of said optical element, wherein one of said first metal and said second metal is distributed so that the concentration increases from a surface of the said optical element toward the interior thereof and the other is distributed so that the concentration decreases from the surface toward the interior.

5. The gradient index optical device according to any one of claims 2, 3 or 4, wherein said first metal and said second metal each comprise a single metal.

6. The gradient index optical device according to any one of claims 2, 3 or 4, wherein said first metal and said second metal each comprise a plurality of metals.

7. The gradient index optical device according to any one of claims 2, 3 or 4, satisfying the following conditions:

$$0.02 < |\Delta n| < 0.2$$

$$0 < |\Delta \nu| < 18.$$

* * * * *